(12) United States Patent
Hanaoka et al.

(10) Patent No.: US 7,748,575 B2
(45) Date of Patent: Jul. 6, 2010

(54) SCREW TYPE MATERIAL FEEDING APPARATUS

(75) Inventors: Kazunari Hanaoka, Hirakata (JP);
Takayuki Okuda, Hirakata (JP);
Hiroshi Hara, Hirakata (JP)

(73) Assignee: Kabushikikaisha Matsui Seisakusho, Osaka (JP)

( * ) Notice: Subject to any disclaimer, the term of this patent is extended or adjusted under 35 U.S.C. 154(b) by 581 days.

(21) Appl. No.: 11/237,309

(22) Filed: Sep. 27, 2005

(65) Prior Publication Data

US 2007/0068970 A1 Mar. 29, 2007

(51) Int. Cl.
*G01F 11/40* (2006.01)
(52) U.S. Cl. .................. 222/240; 222/241; 222/410; 222/412; 222/413
(58) Field of Classification Search .................. 222/252, 222/410, 411–413, 239–242
See application file for complete search history.

(56) References Cited

U.S. PATENT DOCUMENTS

| | | | | | |
|---|---|---|---|---|---|
| 1,398,790 | A | * | 11/1921 | Ogur | 222/36 |
| 1,427,013 | A | * | 8/1922 | Partridge | 222/565 |
| 2,115,464 | A | * | 4/1938 | Kirby | 198/582 |
| 2,390,691 | A | * | 12/1945 | Christie | 86/31 |
| 2,535,476 | A | * | 12/1950 | Anderson | 222/165 |
| 2,799,407 | A | * | 7/1957 | Vanier | 414/326 |
| 3,030,898 | A | * | 4/1962 | Freed | 366/79 |
| 3,093,271 | A | * | 6/1963 | Douglas | 222/413 |
| 3,252,630 | A | * | 5/1966 | Berg | 222/331 |
| 3,513,477 | A | * | 5/1970 | Torahiko | 418/208 |
| 3,580,384 | A | * | 5/1971 | Pingree | 198/550.1 |
| 3,719,307 | A | * | 3/1973 | Larson | 222/236 |
| 3,762,692 | A | * | 10/1973 | Schippers | 366/89 |
| 3,858,765 | A | * | 1/1975 | Landers | 222/413 |
| 3,913,343 | A | * | 10/1975 | Rowland et al. | 62/137 |
| 5,287,801 | A | * | 2/1994 | Clark | 99/451 |
| 5,996,852 | A | * | 12/1999 | Johnson | 222/181.2 |
| 6,039,220 | A | * | 3/2000 | Jablonski et al. | 222/236 |
| 6,135,056 | A | * | 10/2000 | Kuo | 119/51.11 |
| 6,325,588 | B1 | * | 12/2001 | Nolin | 414/526 |

FOREIGN PATENT DOCUMENTS

| | | |
|---|---|---|
| JP | S61-173417 | 10/1986 |
| JP | S63-184942 | 11/1988 |
| JP | 2002-308445 | 10/2002 |
| JP | 2002-316101 | 10/2002 |
| SU | 1630844 A1 * | 9/1988 |

* cited by examiner

*Primary Examiner*—Frederick C. Nicolas
(74) *Attorney, Agent, or Firm*—William L. Androlia; H. Henry Koda

(57) ABSTRACT

A screw type material feeding apparatus in which a screw rotary driving axis with a spiral material supply blade is rotatably contained in a material feeding tube. The apparatus comprises a material divider with plural vanes provided at the distal end of the rotary driving axis, the plural vanes radially project from the screw rotary driving axis.

4 Claims, 3 Drawing Sheets

SCREW TYPE MATERIAL FEEDING APPARATUS

FIELD OF THE INVENTION

The present invention relates to a screw type material feeding apparatus for powdered or granular material such as a screw feeder and so on, and more particularly to a screw type material feeding apparatus for feeding the powdered or granular material stored in a hopper to a next process such as a molding machine.

PRIOR ART

In the prior art, a screw type material feeding apparatus comprised of a screw rotary driving axis like a bar is positioned at the lower end of a hopper for storing a powdered or granular material and connected with a driving means, a spiral material supply blade projected out of the screw rotary driving axis, and a material feeding tube containing thereof.

According to such a screw type material feeding apparatus, when the screw rotary driving axis is rotated, the powdered or granular material stored in the lower part of the hopper is transferred from the base end to the distal end of the material feeding tube by the material supply blade, then the material is supplied to a next step like a molding machine from the feeding port at the distal end of the material feeding tube (for example, see JP-A-2002-308445).

On the other hand, when the screw rotary driving axis is stopped rotating, the powdered or granular material feeding is stopped.

However, when the powdered or granular material is fed, namely the screw rotary driving axis is rotated, the spiral material supply blade transfers the powdered or granular material into the distal end while stirring the material in a circumferential direction of the material feeding tube. In the material feeding tube, the stirred powdered or granular material is positioned at the upper part of the material feeding pipe, then is dropped as a mass, is transferred into the tip end while being stirred again in the circumferential direction, and finally is discharged from a discharge opening.

The powdered material thus discharged is fed in a pulsating manner, so that there has been such problem that the powdered or granular material is not uniformly fed.

On the other hand, when the powdered or granular material is stopped being fed, namely rotation of the screw rotary driving axis is stopped, the supplied powdered or granular material just before being supplied remains around the feeding port of the material feeding tube in such a manner the material forms a mass at the distal end of the material supply blade.

Accordingly, if a minute vibration is generated, the mass around the feeding port is destroyed to fall in the molding machine from the feeding port, thereby causing a problem such that the powdered or granular material is not accurately fed.

The amount of fallen material is in proportion to the bore diameter of the feeding port of the material feeding tube. As the diameter is larger, the amount of fallen material becomes larger.

SUMMARY OF THE INVENTION

The object of the present invention is to solve the above-mentioned problems. The present invention proposes a screw type material feeding apparatus in which a powdered or granular material is uniformly fed and discharged from a discharge opening, the material is prevented from falling from the discharge opening even when a screw rotary driving axis is stopped rotating, and the material is accurately supplied.

According to the present invention, a screw type material feeding apparatus in which a screw rotary driving axis with a spiral material supply blade is rotatably contained in a material feeding tube is comprised of a material divider with plural vanes provided at the distal end of the rotary driving axis, the vanes radially projecting from the screw rotary driving axis.

According to the above-mentioned apparatus, the material divider is rotated together with the screw rotary driving axis, so that the divider does not become an obstacle for feeding and discharging a powdered or granular material which is supplied accompanying by rotation of the screw rotary driving axis. Further, the material divider breaks the discharge opening of material feeding rube into small sectional spaces.

Therefore, the powdered or granular material supplied into the distal end of the material feeding pipe is discharged from the discharge opening after being divided into small amounts, thereby being uniformly fed without being pulsated.

When the screw rotary driving axis is stopped rotating, the powdered or granular material supplied around the discharge opening is kept being divided into the small amounts, so that it is prevented from falling therefrom as a mass and the accurate amount of powdered or granular material can be fed.

According to the screw type material feeding apparatus of the present invention, the material feeding tube is upwards slant in a manner that a discharge opening formed at its distal end is disposed higher than its base portion.

This material feeding tube is inclined in such a manner that the discharge opening at its distal end is above the base end thereof, so that when the screw rotary driving axis is stopped rotating, the powdered or granular material which has not been discharged is prevented from falling from the discharge opening.

According to the screw type material feeding apparatus of the present invention, plural material dividers with different number of vanes are previously prepared, one of which is exchangeably fixed to the screw rotary driving axis.

According to this apparatus, a material divider with different number of vanes can be exchanged depending on the kinds and the supply amount per time of powdered or granular material to be fed.

The present invention has the following effects.

According to the screw type material feeding apparatus of the present invention, the powdered or granular material which has been supplied till the distal end of the material feeding tube is divided into the small sectional spaces to be fed and discharged from the discharge opening, thereby preventing from being pulsated and enabling to be substantially uniformly fed.

When the screw rotary driving axis is stopped rotating, the powdered or granular material which has been supplied around the discharge opening is kept being divided in the small sectional spaces, thereby preventing from falling as a mass and enabling to be fed in an accurate amount.

Further according to the screw type material feeding apparatus of the present invention, the material feeding tube is inclined in such a manner that the discharge opening at its distal end is positioned above the base end, so that when the screw rotary driving axis is stopped rotating, the powdered or granular material which has not been fed is prevented from falling out of the discharge opening.

Still further according to the screw type material feeding apparatus of the present invention, a material divider with different number of vanes can be exchangeably used depending on the kinds and the supply amount per time of powdered or granular material to be fed.

BRIEF DESCRIPTION OF THE DRAWINGS

FIG. 1 is seen from the side.

FIG. 2 is partially enlarged, FIG. 3b is a partial section showing a distal end portion when the screw rotary driving axis is contained in a material feeding tube, FIG. 3b is seen from the discharge opening.

DETAILED DESCRIPTION OF THE INVENTION

The present invention is explained referring to the attached drawings.

Embodiment 1

Figure 1:
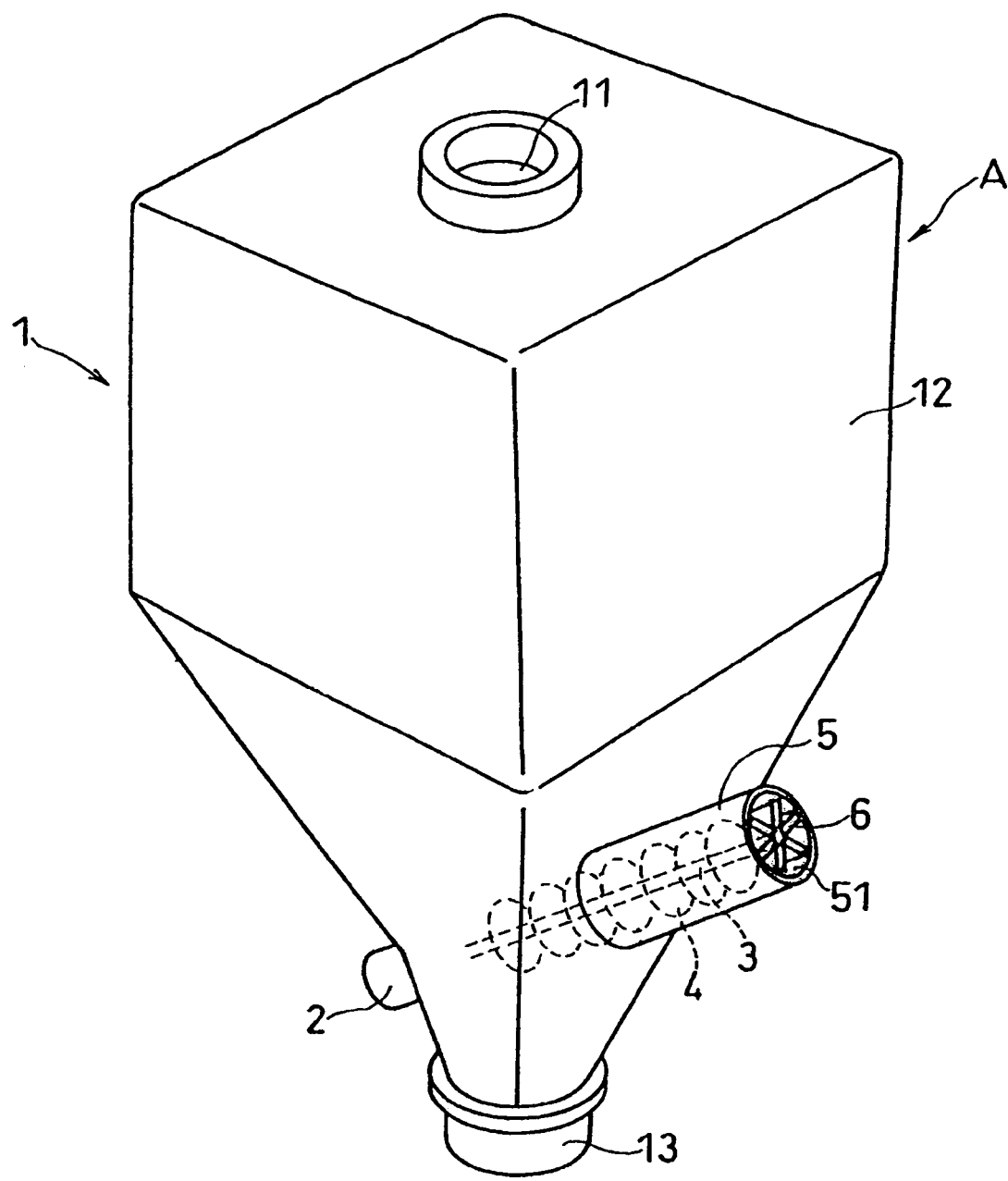
FIG. 1 is a diagrammatical entire perspective view showing one embodiment of a screw type material feeding apparatus A of the present invention.
Figure 2:
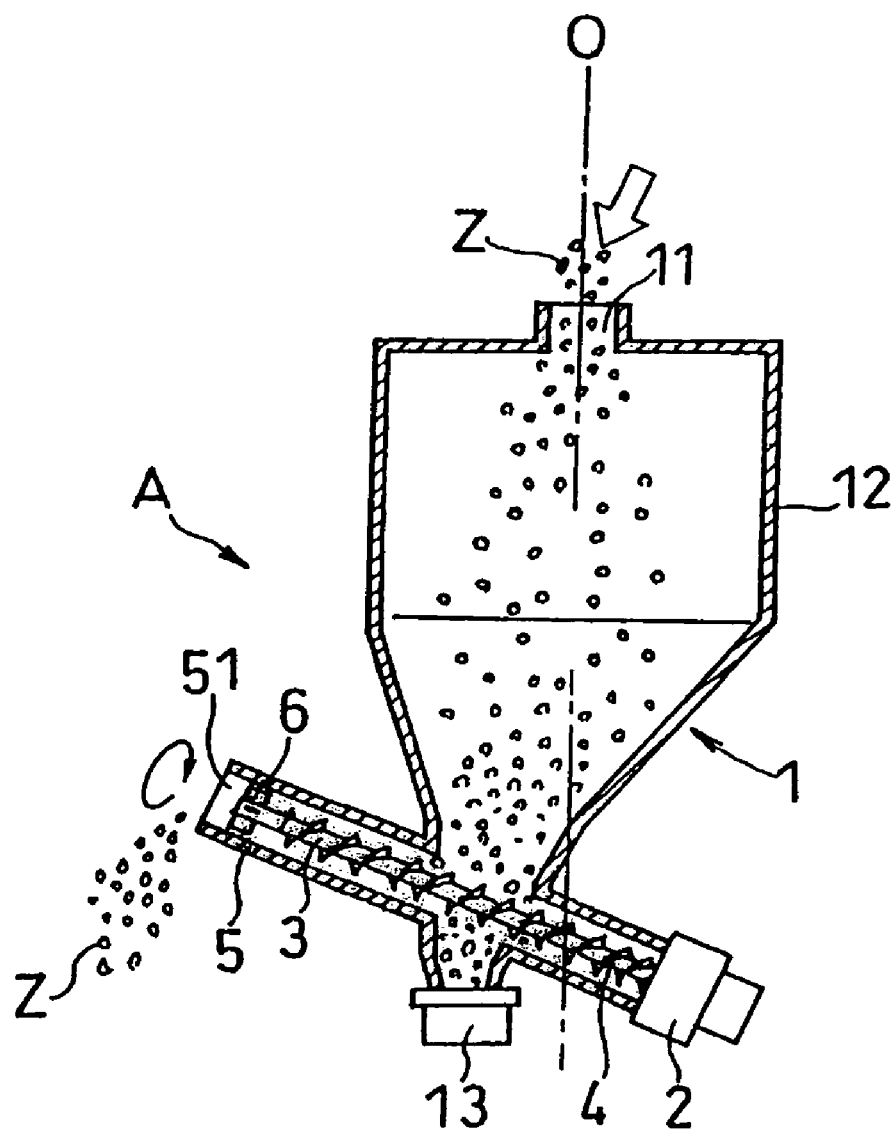
FIG. 2 is a diagrammatical vertical section when

FIG. 1 is a diagrammatical entire perspective view showing one embodiment of a screw type material feeding apparatus A of the present invention. FIG. 2 is a diagrammatical vertical section when FIG. 1 is seen from the side. FIG. 3 is a diagrammatical section in which a substantial part of the present invention shown in FIG. 1 and FIG. 2 is partially enlarged.

The screw type material feeding apparatus A is comprised of a bar-like screw rotary driving axis 3 provided at the bottom of a hopper 1 for storing a powdered or granular material Z and connected to a driving means 2, a spiral material supply blade 4 projected from the screw rotary driving axis 3, and a material feeding tube 5 containing thereof.

The powdered or granular material Z includes powder, granule, minute flake, short fiber, and so on and it may be any material which can be fed by means of the apparatus A of the present invention. In this embodiment, powdered or granular material for resin is used. The powdered or granular material Z may be such material as cement, lime, powdered or granular food or food material.

The hopper 1 includes several kinds of structures like a silo and a storage tank capable of containing the powdered or granular material Z. In this embodiment, the hopper 1 is designed in such a manner that a tubular main body 12 with a material charge port 11 at its top is narrowed downwardly from its middle like a reversed cone (a reversed circular cone or a reversed quadrangular pyramid) so as to collect the powdered or granular material Z at its bottom.

As shown in FIG. 1 and FIG. 2, an open-close cover 13 may be provided at the bottom end of the hopper 1 so as to discharge the powdered or granular material A and to facilitate the maintenance in the hopper 1.

The material feeding tube 5 communicated with the hopper 1 is integrally formed at the lower end of the hopper 1, the driving means 2 like a rotary motor is provided at its base end, and the distal end comprises an open discharge opening 51.

The material feeding tube 5 is inclined such that the discharge opening 51 at the distal end is positioned above the base end as shown in FIG. 2.

The screw rotary driving axis 3 having the material supply blade 4 is inserted in the material feeding tube 5.

The screw rotary driving axis 3 is designed like a bar in such a manner that its base end is connected with the driving means 2 like a rotary motor and the distal end is extended in a longitudinal direction through the center of the material feeding tube 5 into the proximity of the discharge opening 51. The screw rotary driving axis 3 is rotatable accompanied by rotation of the driving means 2.

Figure 3A:
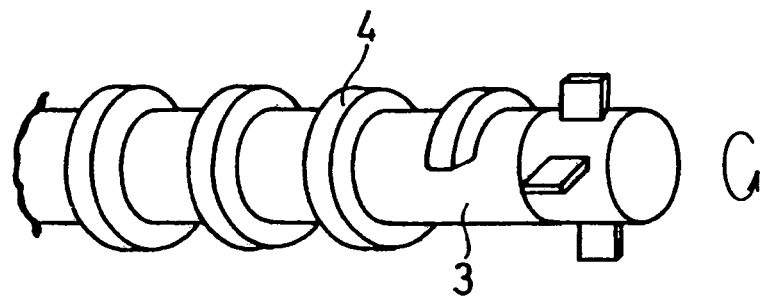
FIG. 3a is a partial perspective view showing a distal end portion of a screw rotary driving axis having a spiral material supply blade.
Figure 3:
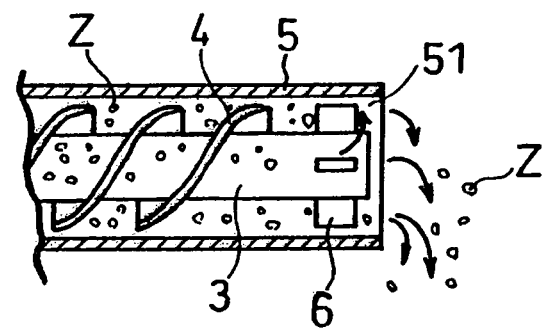
FIG. 3 is a diagrammatical section in which a substantial part of the present invention shown in FIG. 1

The screw rotary driving axis 3 has the material supply blade 4 which is spirally and continuously formed from the base end to the distal end as shown in FIG. 3a.

The material supply blade 4 is projected so as to slide the inner wall of the material feeding tube 5 and to shut off the powdered or granular material Z and is rotated accompanied by rotation of the screw driving axis 3.

Therefore, the material supply blade 4 is sequentially rotated when the screw rotary driving axis 3 is rotated, the powdered or granular material Z at the base end of the material supply blade 4 is pushed into the distal end by rotation of the material supply blade 4 to be fed and discharged from the discharge opening 51 at the distal end.

A material divider with plural vanes 6, which is the feature of the present invention, is provided at the distal end of the screw rotary driving axis 3.

Figure 3C:
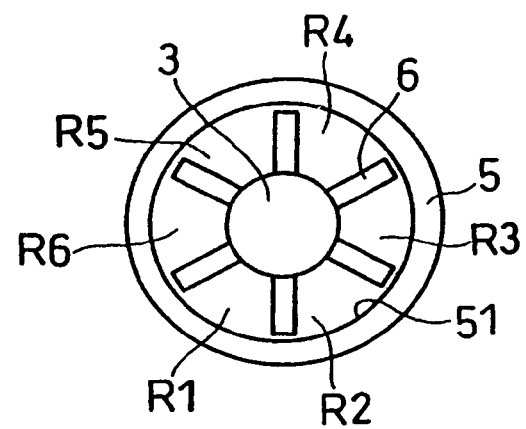
FIG. 3c is a front view when

More specifically, the material divider with plural vanes 6 is projected in a radial direction out of the distal end of the screw rotary driving axis 3 around thereof, namely in a radius direction of the material feeding tube 5 as shown in FIG. 3c.

Although the figure shows six plates of vanes are provided at even intervals in a circumferential direction, more than 2 plates may be provided for the material divider 6.

In the figure the front and back positions of the base of the material divider 6 are positioned in the same direction and in parallel to the screw rotary driving axis 3. However, they may be inclined in different directions and in parallel to the screw rotary driving axis 3.

The shape of the material divider 6 is not limited to a rectangular plate as shown in the figure, it may be trapezoidal or semicircular.

Further, the material divider 6 may be detachable to the screw rotary driving axis 3 in such a manner that the material divider with different number of vanes 6 can be exchanged for the screw rotary driving axis 3. In such a case, the material divider 6 with different number of vanes can be exchangeably used depending on the kinds and the supply amount per time of powdered or granular material Z to be supplied.

Thus designed material divider 6 can break the discharge opening 51 at the distal end of the material feeding tube 5 into six small spaces (R1-R6), so that the powdered or granular material Z supplied into the discharge opening 51 is kept being divided in thus formed small spaces (R1-R6).

More specifically, the powdered or granular material Z thus supplied into the distal end of the material feeding tube 5 is held just before the material divider 6 and is uniformly divided into the small spaces (R1-R6) while being agitated to be discharged from the discharge opening 51.

Therefore, the powdered or granular material Z to be discharged from the discharge opening 51 can be uniformly fed without being pulsated.

If the powdered or granular material Z is a mixture of more than two kinds of material, it can be uniformly divided into the small spaces (R1-R6) by the agitating function of the material divider 6.

The powdered or granular material Z in the small spaces (R1-R6) has increased resistance because the contacting surface is increased by the material divider 6 and the inner wall of the material feeding tube 5. Therefore, when the screw rotary driving axis 3 is stopped rotating, the powdered or granular material Z supplied around the discharge opening 51 is prevented from being dropped. As a result, the amount of powdered or granular material Z fallen from the small spaces (R1-R6) is remarkably reduced comparing to the amount of falling material without providing the material divider 6, thereby enabling to feed an accurate amount of powdered or granular material Z.

As mentioned above, according to the present invention, the material divider 6 is rotated together with the screw rotary driving axis 3, so that it does not become an obstacle when the powdered or granular material Z which has been supplied accompanied by rotation of the screw rotary driving axis 3 is fed or discharged. Further, the material divider 6 breaks the discharge opening 51 of the material feeding tube 5 into sectional small spaces (R1-R6).

Therefore, the powdered or granular material Z which has been supplied into the distal end of the material feeding tube 5 is discharged from the discharge opening 51 after being divided into the sectional small spaces (R1-R6), so that the material is prevented from being pulsated and can be uniformly fed.

When the screw rotary driving axis 3 is stopped rotating, the powdered or granular material Z supplied around the discharge opening 51 is kept being divided into small spaces (R1-R6). Therefore, the material is prevented from being dropped as a mass and an accurate amount of powdered or granular material Z can be fed.

Accordingly, the present invention can be effectively used as a screw type material feeding apparatus capable of feeding an accurate amount of powdered or granular material.

The invention claimed is:

1. A screw type material feeding apparatus in which a screw rotary driving axis with a spiral material supply blade is rotatably contained in a material feeding tube having a discharge opening, comprising:

a material divider with plural vanes fixed at a distal end of said rotary driving axis adjacent said distal end, said plural vanes radially projecting from said screw rotary driving axis and rotating together with said screw rotary driving axis, wherein:

said plural vanes guide material in said material feeding tube in the direction along said rotary driving axis into said discharge opening while dividing said material into small amounts before discharge by rotation of said screw rotary driving axis, thereby uniformly discharging said material from said opening in the direction along said rotary driving axis; and said material feeding tube is upwards slant in a manner that said discharge opening formed at its distal end is disposed higher than its base portion.

2. The screw type material feeding apparatus as set forth in claim 1, wherein a plurality of material dividers with different number of vanes are previously prepared, each of said plurality of material dividers being exchangeably fixed to said screw rotary driving axis for changing of the material.

3. The screw type material feeding apparatus as set forth in claim 2, wherein said apparatus consists of a single spiral material supply blade.

4. The screw type material feeding apparatus as set forth in claim 2, wherein an open/close cover is provided in a wall of said material feeding tube, whereby said material in said material feeding tube can be discharged and maintenance facilitated.

* * * * *